United States Patent Office 3,218,383
Patented Nov. 16, 1965

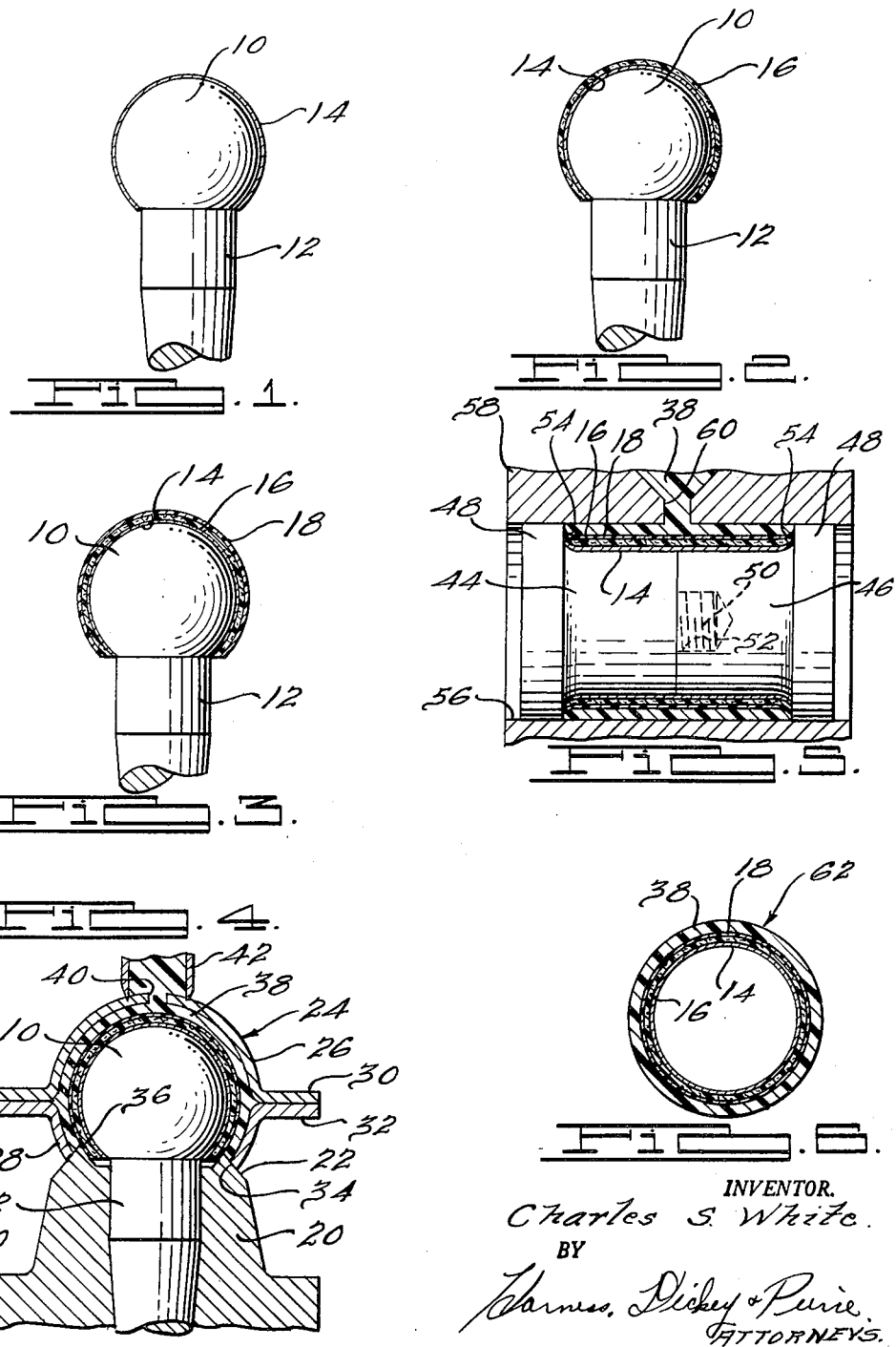

3,218,383
METHOD OF MAKING BEARING ELEMENT
Charles S. White, Rte. 3, Box 454–H, Palmdale, Calif.
Filed Feb. 20, 1961, Ser. No. 90,541
11 Claims. (Cl. 264—130)

This invention relates to a method of making molded bearings having a working face of relatively short low friction fibers.

A great deal of development work has been expended in adapting polytetrafluoroethylene, hereinafter referred to by its trade name Teflon, for use in bearings in order to provide a bearing construction that does not require lubrication. Intially, the Teflon was employed in sheet or solid form, but experience proved that it was not suitable for bearings operating under relatively high loads because the Teflon would cold flow. Further development work resulted in the employment of Teflon in fabric form since the Teflon fabric has a tensile strength approximately twenty-five times greater than Teflon in sheet form and, therefore, has improved resistance to cold flow. However, the high cost of the Teflon fabric significantly increased the cost of the final bearing.

It is one object of the present invention to provide a method for making a bearing having Teflon (or other equivalent low friction material) in flock form, i.e., small chopped-up fibers of Teflon, firmly fixed on the surface of a suitable hardened backing material formed to the desired bearing surface.

It is another object of the invention to provide a method for making a molded bearing wherein a low friction flock material is retained on the surface of a bearing element, such as the surface of a ball or shaft, by a suitable low friction material such as grease, and a hardenable backing material is molded about the bearing element in a manner to conform the flock material exactly to the surface thereof and mechanically retain the flock material against movement relative to the backing material after it hardens.

It is a further object of the invention to provide a method for making molded bearings as described above wherein the grease or equivalent low friction material is frozen after the flock material is applied thereto so as to more firmly retain the flock material in position while the hardenable backing material is molded thereabout.

It is a still further object of the invention to provide a method for molding a bearing which is relatively inexpensive, readily adaptable to mass production techniques, and which produces a rugged and effective bearing that can operate under high loading conditions.

Other objects and features of novelty of the invention will be specifically pointed out or otherwise become apparent when referring, for a better understanding of the invention, to the following description taken in conjunction with the accompanying drawings wherein:

FIG. 1 is an elevational view of a stud and ball with a first coating of grease or the like applied to the ball in accordance with the first step of one embodiment of the present invention;

FIG. 2 is a view of the structure of FIG. 1 with a coating of low friction flock material applied to the first coating on the surface of the ball;

FIG. 3 is a view of the structure of FIG. 2 with a thin sprayed layer of hardened material applied to the flock material;

FIG. 4 is a view of the stud and ball of FIG. 3 supported within an arbor with a housing disposed about the ball and a hardenable backing material injected within the housing to provide a rigid backing for the layers applied to the surface of the ball, the housing and arbor being shown in section;

FIG. 5 is a sectional view of molding apparatus for molding a bushing in accordance with the method of the present invention; and FIG. 6 is a sectional view of the bushing of FIG. 5.

Referring to FIGS. 1–4 the method of the present invention is illustrated, by way of example, for making the molded ball joint assembly of FIG. 4. As illustrated in FIG. 1 a ball 10 on the upper end of a stud 12 is coated with a relatively thin layer of suitable low friction material such as grease, for example. A layer of low friction flock material 16 is then coated on the layer 14 as illustrated in FIG. 2 so as to be partially embedded therein.

The flock material comprises small chopped-up fibers of a suitable low friction resin material, preferably Teflon fibers, which are retained on the surface of the ball by the layer 14. The layer of flock material 16 is suitably built up and evenly distributed over the layer 14 or surface of the ball so as to provide an exposed, relatively solid layer of low friction fibers. Since the purpose of the layer 14 is to retain the flock material on the surface of the ball, it will hereinafter be referred to in the specification and claims as the flock-retaining layer.

After the layer of flock material 16 has been applied, the two layers are preferably cooled by any suitable means until the flock-retaining layer 14 is frozen or substantially hardened so that it more firmly retains the flock material 16 in position on the surface of the ball 10. A thin layer 18 (FIG. 3) of a suitable hardenable material, preferably a thermosetting resin material such as a phenol formaldehyde resin, is sprayed or otherwise applied over the surface of the layer of flock material 16 and cured or hardened to provide a relatively thin, impervious barrier layer of hardened material mechanically locked to the layer of flock material 16. The mechanical locking is obtained by the embedding of the protruding rear portions of the individual fibers of the flock material in the surface of the layer 18 after it hardens or cures. During the application of the layer 18 of hardenable material, which is generally in a heated condition so that it can be readily sprayed or coated on the layer of flocking material 16 and thereafter hardened, the frozen flock-retaining layer 16 may begin to thaw, but it will remain frozen for a long enough period to enable the layer 18 to be completely applied. Of course, once the layer 18 hardens it will mechanically retain the layer of flock material 16 in position against the surface of the ball and the flock-retaining layer will have served its purpose. Thereafter, the only requirement of the layer 14 is that it should not stick or adhere to the ball or interfere with the low friction engagement of the layer of flock material 16 with the ball. It is apparent that a low friction material such as grease is preferred for use as the flock-retaining layer 14 since it will also serve as a temporary lubricant between the layer of low friction flock material and the surface of the ball after the bearing is completed.

Referring to FIG. 4, the stud and ball of FIG. 3 with the three coatings applied thereto as previously described, is supported in the bore of a suitable arbor 20 having an annular tapered upper end 22. A housing 24 comprising an upper stamping 26 and a lower stamping 28 is positioned about the ball with the flanges 30 and 32 secured together in any suitable manner, such as by spot welding. The lower stamping 28 has an enlarged aperture 34 therein and is supported on the annular tapered upper end 22 of the arbor so that the ball 10 is centered within the housing 24 in a manner to define a space between the housing and the layers on the ball 10. If desired, the upper end of the arbor 20 can also engage or pinch the outer layer 18 of hardened material as at 36 to fix the layers against movement relative to the surface of the ball.

A suitable hardenable backing material 38 can then be injected through a small aperture 40 in the dome of the upper stamping 26 from an injection nozzle 42 of a suitable injection machine (not shown) so as to completely fill the space within the housing and accurately conform the layer of low friction flocking material 16 to the surface of the ball 10 under pressure. The impervious layer of hardened material 18 acts as a barrier layer to prevent penetration of the hardenable material 38 to the surface of the ball 10. The annular upper end 22 of the arbor 20 seals off the annular opening at the throat of the ball joint to prevent the hardenable material 38 from escaping and to enable it to be injected under a predetermined pressure to make certain that it completely fills the space within the housing and exerts a predetermined pressure on the layers of material disposed about the ball.

The hardenable material 38 can be any suitable formable material which can be molded about the layers of material disposed about the ball and hardened so as to provide the desired rigid backing. A resin material is preferred and, if desired, a phenol formaldehyde resin material can be used so that it will bond directly to the hardened coating 18 as it is molded thereabout. If the hardenable material 38 is such that it will not bond directly to the hardened coating 18 as it is molded thereabout, a suitable layer of adhesive or bonding material, such as the "Cycle Weld" material made by the Chrysler Corporation, may be disposed over the coating 18 before the hardenable material is injected to ensure that it is bonded to the coating 18 after it hardens.

After the material 38 has been injected, the injection nozzle 42 is removed, and the ball joint assembly lifted from the arbor 20 to complete the operation. In the resulting ball joint construction the layer of low friction flock material 16 is accurately molded under pressure directly to the surface of the ball 10 by the hardenable material 38 to provide an accurate area conformation that is not obtainable by mating separately made elements together. If the low friction flock material employed in Teflon, the cold flow characteristics of the Teflon low friction surface will be nearly equal to that of the more expensive Teflon fabric. Further, since Teflon fibers can not be satisfactorily adhesively bonded to other materials, the present invention provides an excellent means for mechanically retaining the Teflon fibers in position and thus overcoming the bonding problems presented by Teflon.

In its broader aspects, the method of the present invention relates to the application of low friction flock material directly to the surface of a bearing element and retaining the flock material thereon while molding a hardenable backing material thereabout. Therefore, it is to be understood that the invention is not limited to a particular type of bearing, such as ball joints, but is applicable to other types of bearings as well. For example, as illustrated in FIGS. 5 and 6, the present invention may be advantageously employed in making bushings. Referring to FIG. 5, a pair of cylindrical elements 44 and 46 each having enlarged annular flanges 48 on the outer ends thereof are suitably secured together at their inner ends, such as by a threaded stud 50 secured to the cylindrical element 44 and threaded into an internally threaded bore 52 in the stud 50. Assuming that grease is used as the flock-retaining layer 14, it is coated directly onto the surface of the cylindrical elements 44 and 46 between the flanges 48. The layer of flock material 16 is thereafter applied, the grease frozen and the hardened coating 18 applied as previously described with reference to FIGS. 1–3.

The entire assembly is then slipped into a bore 56 of a mold 58 having an aperture 60 therein communicating with the space between the annular flanges 48 which sealingly engage the wall of the bore 56. The hardenable material 38 is then injected through the aperture 60 to completely fill the space within the bore between the flanges 48 under pressure to accurately conform the layer of low friction flock material 16 to the surface of the cylindrical elements 44 and 46 in the same manner that it accurately conformed the layer of low friction material 16 to the surface of the ball 10 as previously described.

It will be observed that the filets or rounded corners 54 of the cylindrical elements provide corresponding curved or flared portions at the ends of the flock layer 16. This enables a shaft to be more easily inserted into the completed bushing 62 (FIG. 6) after the cylindrical elements have been removed.

After the hardenable material 38 is hardened, the cylindrical elements 44 and 46 are pulled out of the bore 56 breaking the relatively small connection at the aperture 60 by the shearing force applied, and the cylindrical elements 44 and 46 are separated to disengage the bushing 62 illustrated in FIG. 6. In the bushing 62 the layer of low friction flock material 16 is embedded in the hardened coating 18 so that it is mechanically retained in position, and the hardened coating 18 is suitably bonded to the hardenable material 38 as previously described. The layer of grease 14 may be permitted to remain on the surface of the low friction flock material 16 since it merely provides additional lubrication for the surface of the shaft which the bushing 62 is to support. However, it is again noted that the layer of low friction flock material 16 provides the low friction surface for the bushing 72, and if the Teflon fibers or the like are used, the bushing will not require any lubricant after the layer of grease 14 dissipates through use.

Although in the embodiments of the present invention described, the hardened coating 18 has been employed as a barrier layer, it is apparent that this coating could possibly be eliminated and the hardenable material 38 molded directly about the layer of flock material 16 if it is carefully done. To do this, compression or transfer molding techniques, rather than injection molding would preferably be employed. Further, if the layer of flock material is closely matted, it will tend to act as a barrier layer itself to prevent the penetration of the hardenable material to the surface of the ball. Along these same lines if the molding operation is very carefully controlled the step of freezing the grease may also possibly be eliminated, but it is apparent that both freezing the grease and applying the hardened coating provide very important advantages.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. A method of making a bearing which includes the steps of applying to a surface a layer of transient bonding material, applying a layer of a low-friction organic polymeric material to said layer of transient bonding material to cause said low-friction organic polymeric material to transiently bond to said layer of transient bonding material with portions of said low friction organic polymeric material extending outwardly of said layer of transient bonding material, applying a layer of hardenable material over said layer of low friction organic polymeric material whereby the projecting portions of said layer of low friction organic polymeric material become embedded in said layer of hardenable material, and then hardening said hardenable material, said layer of transient bonding material having relatively poor adhesion to said surface thereby allowing movement of the latter relative to said low friction organic polymeric material after said hardenable material hardens.

2. A method as set forth in claim 1 wherein said low friction organic polymeric material is polytetrafluoroethylene and wherein said hardenable material is a thermosetting resin.

3. A method as set forth in claim 1 wherein said transient bonding material is a lubricating grease.

4. A method of making a molded bearing comprising applying a layer of flock-retaining material to the surface of a bearing element, applying a layer of low friction flock material to said layer of flock-retaining material, and applying a layer of hardenable material about said layer of flock material which mechanically retains the latter in position after said hardenable material hardens, said layer of flock-retaining material having relatively poor adhesion to said bearing element thereby allowing movement of the latter relative to said flock material after said hardenable material hardens.

5. A method of making a molded bearing comprising applying a layer of flock-retaining material to the surface of a bearing element, said flock-retaining material being relatively soft when relatively warm and becoming relatively harder on cooling, applying a layer of low friction flock material to said layer of flock-retaining material while the latter is relatively warm, cooling said layer of flock-retaining material to cause the latter to become harder, and applying a layer of hardenable material about said layer of flock material which mechanically retains the latter in position after said hardenable material hardens, said layer of flock-retaining material having relatively poor adhesion to said bearing element thereby allowing movement of the latter relative to said flock material after said hardenable material hardens.

6. A method of making a molded bearing comprising applying a layer of flock-retaining material to the surface of a bearing element, applying a layer of low friction flock material to said layer of flock-retaining material, spraying a layer of hardenable material about said layer of flock material, and hardening said layer of hardenable material with said flock material embedded in and mechanically retained in position on the face thereof, said layer of flock-retaining material having relatively poor adhesion to said bearing element thereby allowing movement of the latter relative to said flock material after said hardenable material hardens.

7. A method of making a molded bearing comprising applying a layer of flock-retaining material to the surface of a bearing element, applying a layer of low friction flock material to said layer of flock-retaining material, spraying a layer of hardenable material about said layer of flock material, hardening said layer of hardenable material with said flock material mechanically retained in position on the face thereof, and molding a hardenable backing material about said layer of hardenable material in a manner to accurately conform said layer of flock material to said surface of said bearing element and to provide a rigid backing upon hardening of said backing material, said layer of flock-retaining material having relatively poor adhesion to said bearing element thereby allowing movement of the latter relative to said flock material after said first-named hardenable material hardens.

8. A method of making a molded bearing comprising applying a layer of flock-retaining material to the surface of a bearing element, said flock-retaining material being relatively soft when relatively warm and becoming relatively harder on cooling, applying a layer of low friction flock material to said layer of flock-retaining material while the latter is relatively warm, cooling said layer of flock-retaining material to cause the latter to become harder, spraying a layer of hardenable material about said layer of flock material, hardening said layer of hardenable material with said flock material mechanically retained in position on the face thereof, and molding a hardenable backing material about said layer of hardenable material to accurately conform said layer of flock material to said surface of said bearing element and to provide a rigid backing therefor, said layer of flock-retaining material having relatively poor adhesion to said bearing element thereby allowing movement of the latter relative to said flock material after said first-named hardenable material hardens.

9. A method of making a molded bearing comprising applying a layer of lubricant of tacky consistency to the surface of a bearing element, applying a layer of polytetrafluoroethylene resin flock material about said layer of lubricant, and applying a layer of hardenable material about said layer of flock material with the latter at least partially embedded in the face of said layer of hardenable material so as to be mechanically retained in position thereon when said hardenable material hardens, said layer of lubricant having relatively poor adhesion to said surface of said bearing element thereby allowing movement of the latter relative to said flock material after said hardenable material hardens.

10. A method of making a molded ball joint assembly comprising applying a layer of flock-retaining material to the surface of the ball portion of a ball stud, applying a layer of low friction flock material to said layer of flock-retaining material, applying a relatively thin layer of hardenable material about said layer of flock material with the latter mechanically retained in the face of said layer of hardenable material, positioning a housing about said ball portion of said ball stud, and injecting a hardenable backing material within said housing under pressure to accurately conform said layer of flock material to the suface of said ball portion of said ball stud and to provide a rigid backing therefor after said hardenable materials harden, said layer of flock-retaining material having relatively poor adhesion to said surface of said ball portion of said ball stud thereby allowing movement of the latter relative to said flock material after said hardenable matreials harden.

11. The method of making a bushing comprising applying a layer of flock-retaining material to the surface of a cylindrical element, applying a layer of flock material about said layer of flock-retaining material, applying a relatively thin hardenable coating about said layer of flock material, positioning said cylindrical element in a bore of a mold, and injecting a hardenable material within said bore and about said coating under pressure to accurately conform said layer of flock material to said surface of said cylindrical element and to provide a rigid backing therefor when said hardenable materials harden, said flock-retaining layer having relatively poor adhesion to said surface of said cylindrical element thereby allowing movement of the later relative to said flock material after said hardenable materials harden.

References Cited by the Examiner
UNITED STATES PATENTS

| | | | |
|---|---|---|---|
| 1,082,231 | 12/1913 | Nale | 264—261 |
| 1,169,985 | 2/1916 | Mickelson | 264—255 |
| 1,881,601 | 10/1932 | Hufferd et al. | |
| 2,453,739 | 11/1948 | Bates | 18—59 |
| 2,747,230 | 5/1956 | Magnus | 18—59 |
| 2,754,050 | 7/1956 | Wellington. | |
| 2,815,253 | 12/1957 | Spriggs | 308—238 |
| 2,890,041 | 6/1959 | Runton | 308—238 XR |
| 2,906,573 | 9/1959 | Runton | 308—238 |
| 2,948,651 | 8/1960 | Waag | 264—255 |
| 3,011,219 | 12/1961 | Williams | 18—59 |
| 3,089,198 | 5/1963 | Eirhart | 264—262 |
| 3,094,376 | 6/1963 | Thomas | 264—242 |

FOREIGN PATENTS 840,686    7/1960    Great Britain.

ROBERT F. WHITE, *Primary Examiner.*

RICHARD A. DOUGLAS, WILLIAM J. STEPHENSON, ALEXANDER H. BRODMERKEL, *Examiners.*